United States Patent
Hollins et al.

[11] Patent Number: 5,882,785
[45] Date of Patent: Mar. 16, 1999

[54] NONLINEAR OPTICAL FILMS FROM PAIR-WISE-DEPOSITED SEMI-IONOMERIC SYNDIOREGIC POLYMERS

[75] Inventors: Richard A. Hollins; Geoffrey A. Lindsay; Marion J. Roberts; Peter Zarras; John D. Stenger-Smith, all of Ridgecrest, Calif.; Kenneth J. Wynne, Falls Church, Va.; Andrew P. Chafin, Ridgecrest, Calif.

[73] Assignee: The United States of America as represented by the Secretary of the Navy, Arlington, Va.

[21] Appl. No.: 800,943

[22] Filed: Jan. 23, 1997

[51] Int. Cl.⁶ .................... C09K 19/02; C09K 19/48; B05D 1/20
[52] U.S. Cl. .................... 428/333; 428/1; 428/411.1; 428/474.7; 349/183; 427/162; 427/169; 427/407.2; 427/430.1; 427/434.3
[58] Field of Search ............ 428/1, 411.1, 333, 428/474.7; 427/162, 163.1, 169, 407.2, 430.1, 434.3; 252/582, 583, 584, 586, 587, 588; 349/182, 183

[56] References Cited

U.S. PATENT DOCUMENTS

| | | | |
|---|---|---|---|
| 5,162,453 | 11/1992 | Hall et al. | 525/404 |
| 5,208,111 | 5/1993 | Decher et al. | 428/420 |
| 5,247,055 | 9/1993 | Stenger-Smith | 528/310 |
| 5,247,602 | 9/1993 | Penner et al. | 385/122 |
| 5,397,508 | 3/1995 | Masse et al. | 252/582 |
| 5,517,350 | 5/1996 | Cabrera et al. | 359/326 |
| 5,520,968 | 5/1996 | Wynne et al. | 428/1 |

*Primary Examiner*—Paul Thibodeau
*Assistant Examiner*—D. Lawrence Tarazano
*Attorney, Agent, or Firm*—Gregory M. Bokar; David S. Kalmbaugh

[57] ABSTRACT

This invention is comprised of new nonlinear optic polymers and a new Langmuir-Blodgett (LB) film deposition scheme for which these polymers were designed. The invention is unique because it produces an electro-optic film which has never undergone electric-field poling nor high temperature treatment. It eliminates the dilution effect of the long hydrophobic alkyl groups, and creates stronger ionic bonds between the polymer chains. Finally, the invention reduces the time to make a film of a given thickness by at least half by virtue of depositing two polymer layers per stroke. The new polymers are comprised of asymmetric chromophores linked head-to-head by alternating two different kinds of bridging groups. One of the bridging groups contains one or more ionic groups, and the other bridging group contains one or more non-ionic, hydrophilic groups.

18 Claims, 7 Drawing Sheets

Typical ionic nonlinear optical polymers of this invention.

F-type polycation

S-type polyanion

Figure 1. Typical ionic nonlinear optical polymers of this invention.
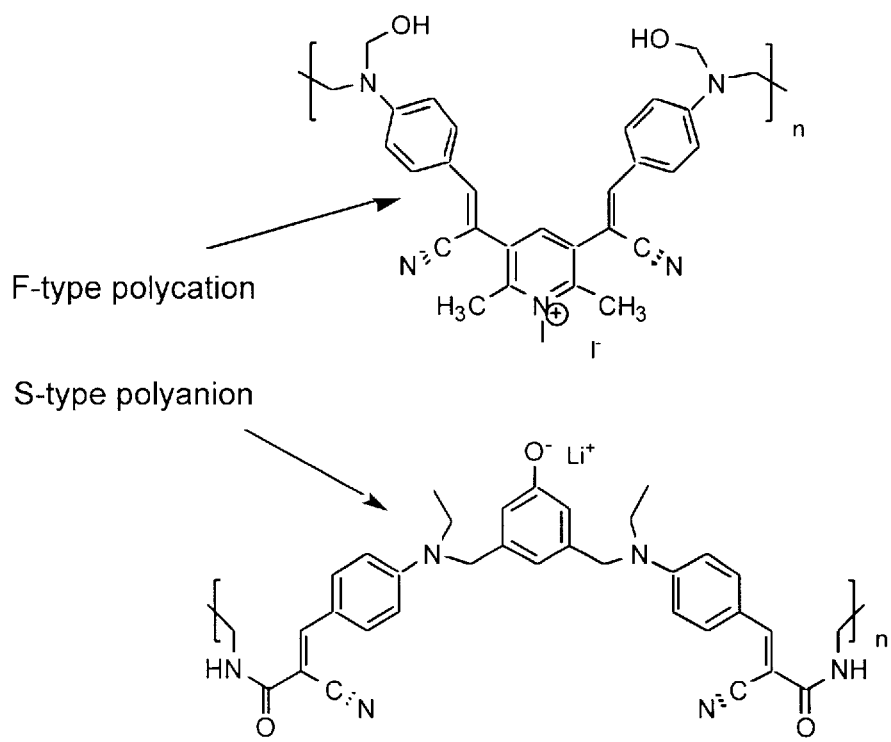

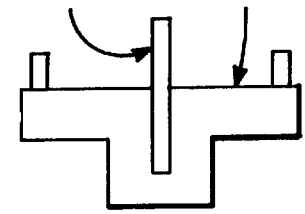

SUBSTRATE   LB TROUGH

STEP 1; THE LB TROUGH IS FILLED WITH AQUEOUS 0.001m POLYANION. THE SUBSTRATE IS POSITIONED AT THE BOTTOM OF ITS STROKE AND THE BARRIERS ARE FULLY OPEN.

FIG. 2A

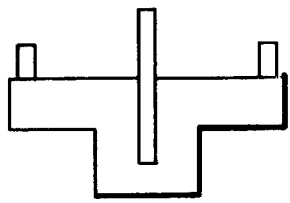

STEP 2; A 0.5 M ORGANIC SOLUTION OR WATER-INSOLUBLE POLYCATION IS PLACED DROPWISE ON THE LIQUID SURFACE AND THE SOLVENT IS ALLOWED TO EVAPORATE. THE POLYANION IONICALLY BONDS WITH THE POLYCATION AT THE ARGON/LIQUID INTERFACE.

FIG. 2B

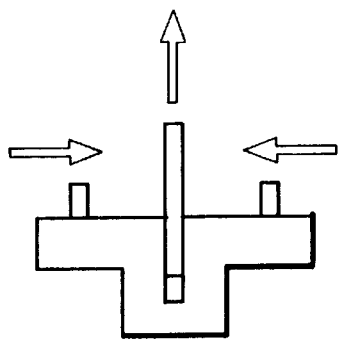

STEP 3; THE POLYCATION/POLYANION BILAYER IS COMPRESSED LATERALLY. ONCE THE TARGET SURFACE PRESSURE IS REACHED ONE BILAYER IS DEPOSITED AS THE SUBSTRATE IS MOVED UPWARD TO THE TOP OF ITS STROKE.

FIG. 2C

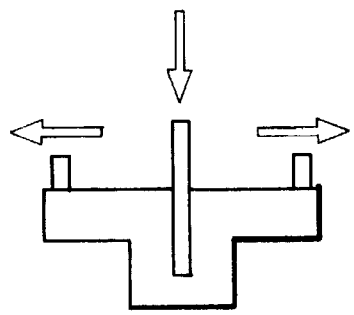

STEP 4; THE LATERAL PRESSURE ON THE BILAYER IS RELEASED. THE SUBSTRATE IS REPOSITIONED AT THE BOTTOM OF ITS STROKE AND THE DIPPING CYCLE IS REPEATED BEGINNING WITH STEP 1.

FIG. 2D

Figure 3. Quadratic enhancement of SHG intensity and linear increase in UV/Vis absorbance as a function of the number of F and S bilayers.
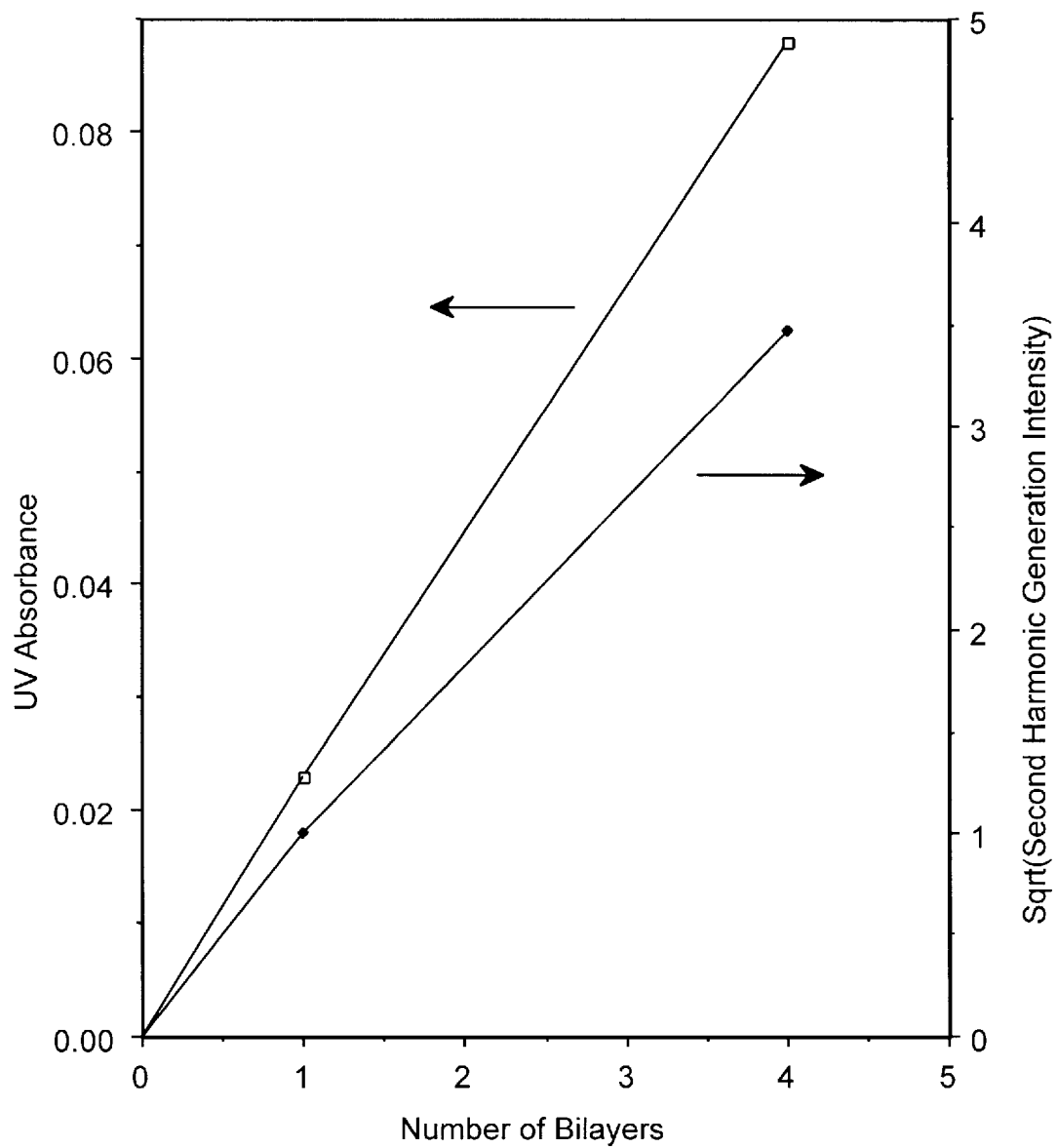

Figure 4. Attenuated Total Reflection Fourier Transform Infrared (ATR FTIR) Spectra.
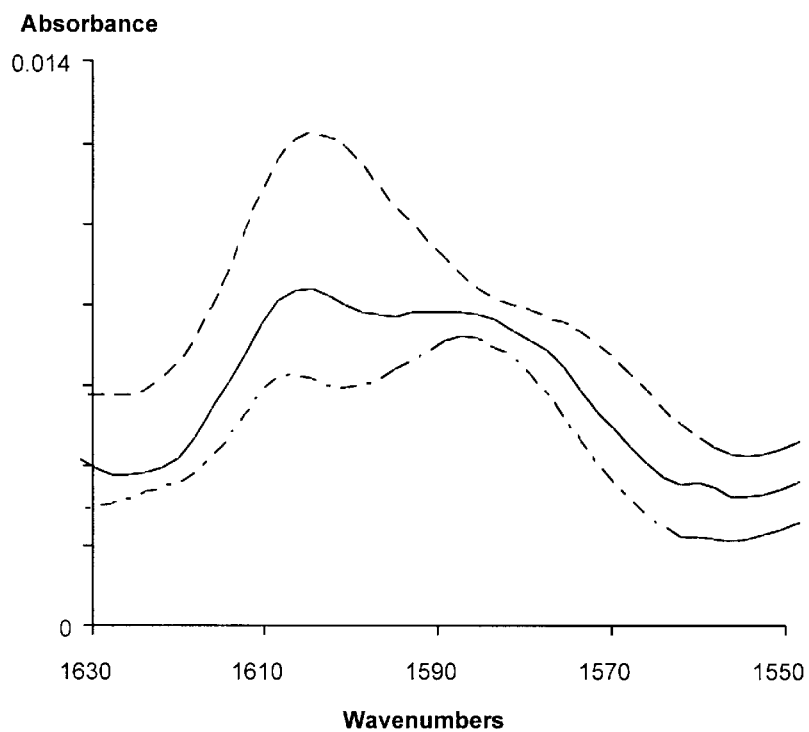
Key: polycation monolayer on ZnSe ( - · - ), polyanion adsorbed from aqueous solution on ZnSe ( - - - ), and polycation/polyanion bilayer on Si ( ___ ).

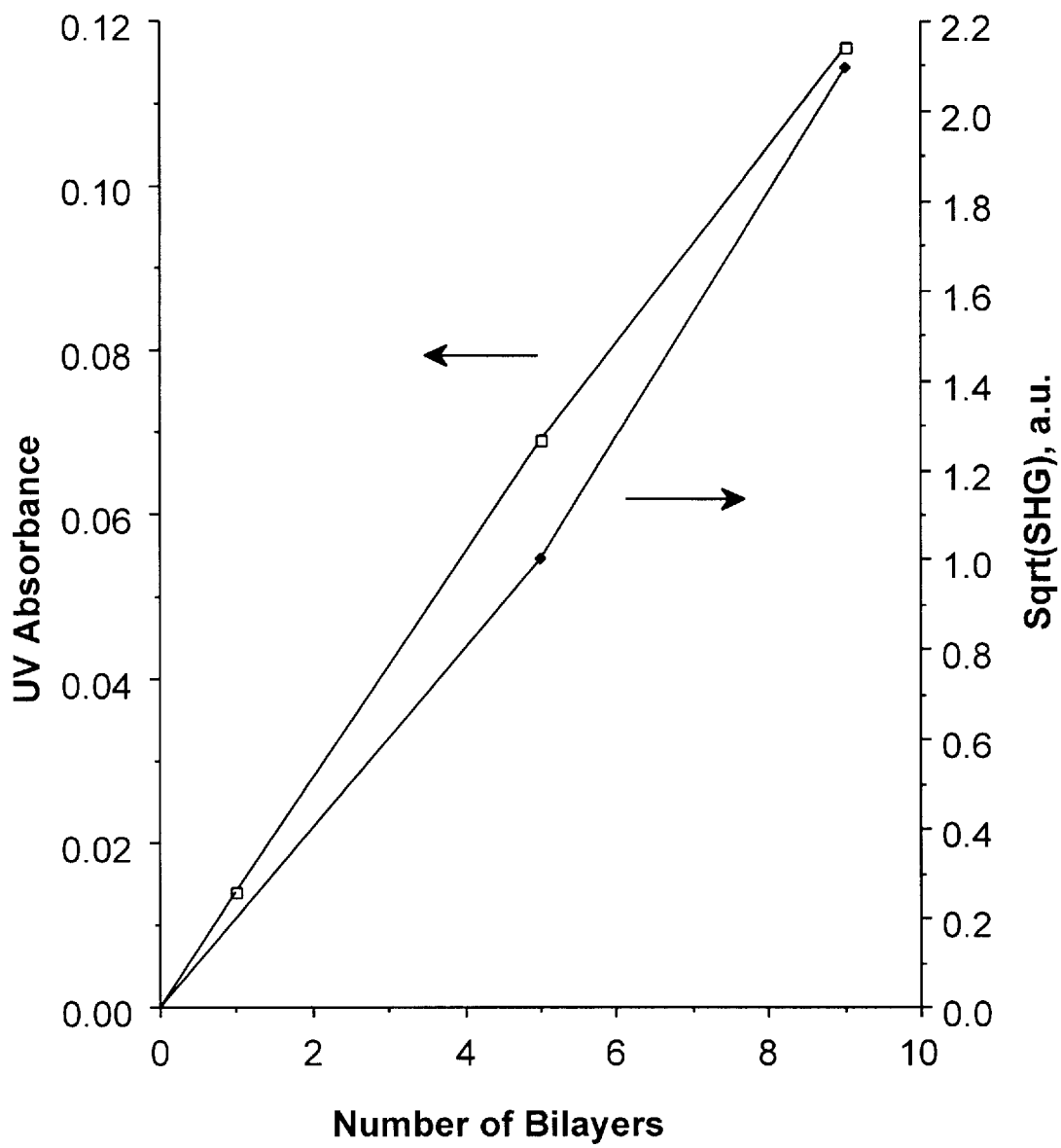
Figure 5. Floating Cationic Accordion Polymer F:
Aq. Soln. of Glucose Phosphate Subphase

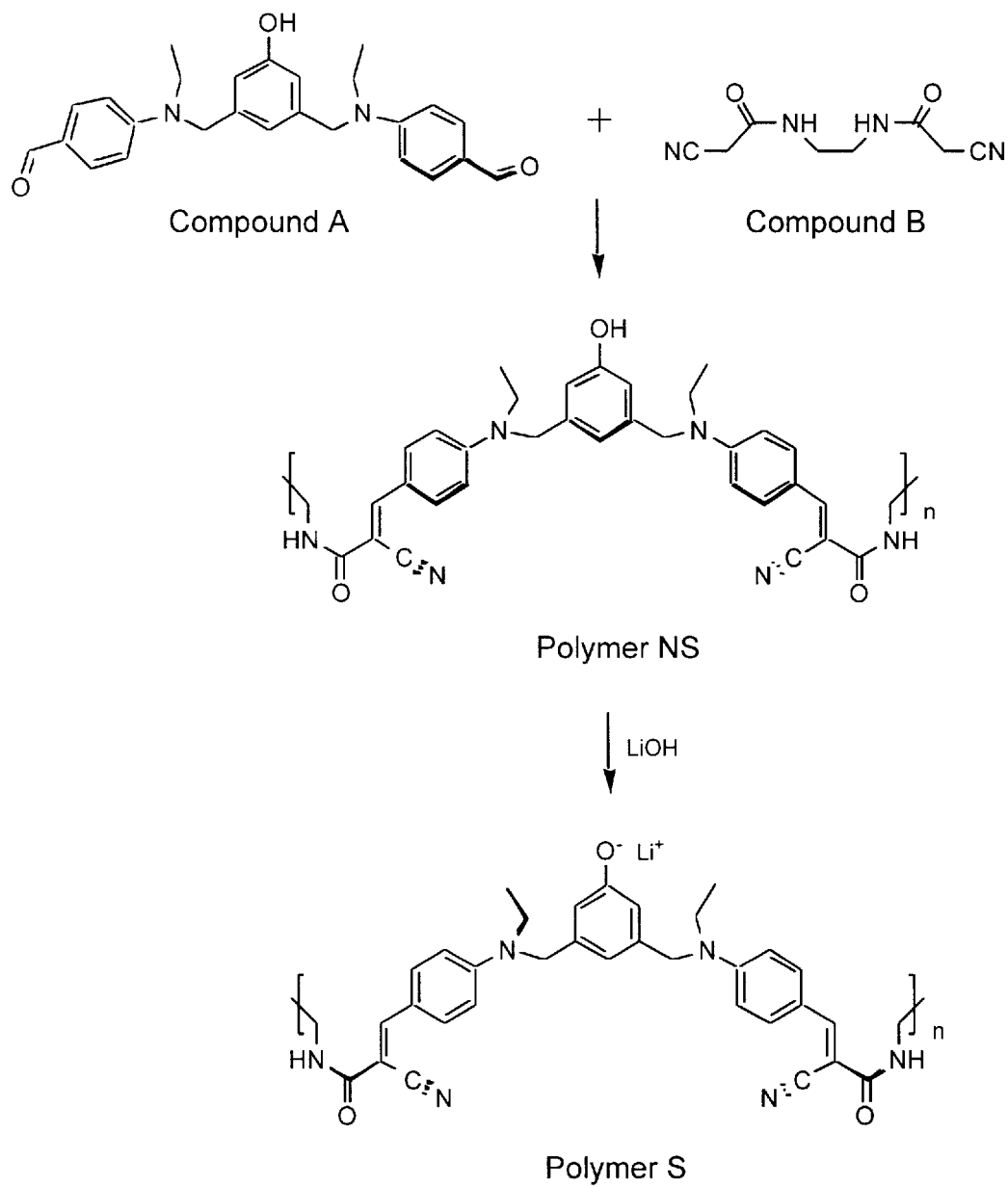
Figure 6. Synthetic scheme used to make the nonlinear optical polymer S of this invention.

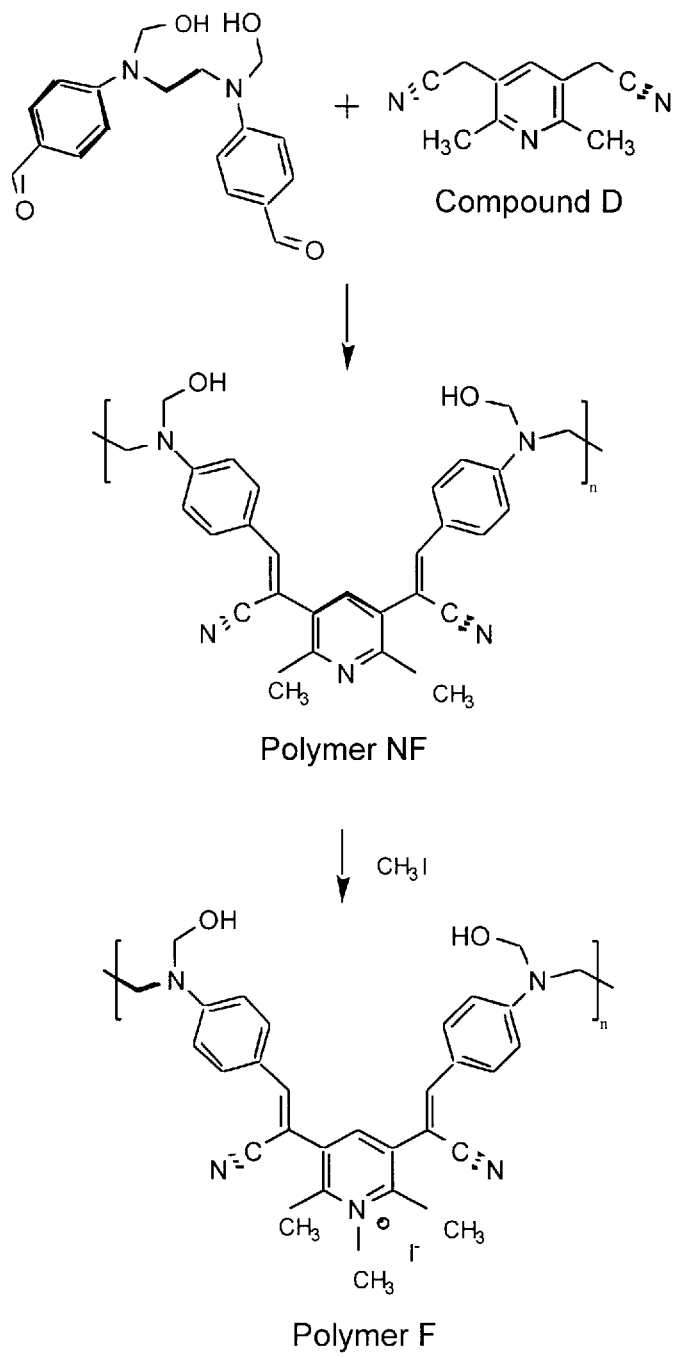
Figure 7. Synthetic scheme used to make the nonlinear optical polymer F of this invention.

NONLINEAR OPTICAL FILMS FROM PAIR-WISE-DEPOSITED SEMI-IONOMERIC SYNDIOREGIC POLYMERS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

MICROFICHE APPENDIX

Not Applicable.

BACKGROUND OF THE INVENTION

1. Field of the Invention

This invention relates generally to organic polymeric thin films for photonic applications. Specifically, the invention focuses on the process for making second-order nonlinear optical polymeric (hereinafter, NLOP) films.

2. Description of the Prior Art

The following information is provided as a brief overview of technology relevant to this invention. For a more detailed discussion involving this technology please refer to U.S. Pat. No. 5,247,055 issued Sep. 21, 1993 to Stenger-Smith et al., 5,520,968, issued May 28, 1996 to Wynne et al., and the book, Polymers for Second-Order Nonlinear Optics, G. A. Lindsay and K. D. Singer, Eds., Am. Chem. Soc. Advances in Chemistry Series 601, Washington, D.C., 1995.

Organic polymeric thin films for photonic applications has been a rapidly evolving area of research for over ten years. One class of materials within this field, NLOP films, has potential for breakthroughs in low cost integrated devices for the telecommunication and data-communication industries. Key components of this new technology are electro-optic (EO) waveguides made from second-order nonlinear optical polymer films. These waveguides have the potential to switch optical signals from one path to another and also to modulate the phase or amplitude of an optical signal.

The molecular origin of optical nonlinearity derives from the electrical polarization of the chromophore as it interacts with electromagnetic radiation. The molecular structure of the chromophore and its orientation govern the nonlinear optical properties of the system. Furthermore, it is the polymer structure that dictates the processability and temporal stability of the final product.

In order for films to have a large NLO coefficient, they must contain a high concentration of asymmetrical, highly polarizable chromophores arranged in a highly polarized configuration. In the past few years, several types of polymers have been developed which are effective in EO modulation of optical signals.

As previously noted, the polymer structure dictates the processability and temporal stability of the final product. Chromophores in the polymers are usually aligned by electric field poling near the glass transition temperature. When the film is cooled, alignment of the chromophores is frozen in the desired position.

Guest-host systems:

This class (guest-host systems) of nonlinear optical polymers consists of small molecular, asymmetric chromophores dissolved in glassy polymers. These solid solutions typically contain small molecular chromophores dissolved in high molecular weight polymers. Guest-host systems typically contain 10–20% by weight of the chromophore. A drawback of guest-host materials is the fact that the glass transition temperature of the polymer decreases due to plasticization by the chromophore. In addition, chromophores in guest-host systems are to some degree labile (they diffuse to the surface of the film and may evaporate at elevated temperature). Chromophores on the surface of guest-host films can be absorbed through the skin. These chromophores are often toxic, mutagenic, teratogenic and carcinogenic. By attaching these chromophores to a high molecular weight polymer, which cannot be absorbed through the skin, the health hazards are greatly minimized.

In spite of these limitations, guest-host systems may have practical applications if the polymer selected has a high glass transition temperature (>250° C.) and a large chromophore is utilized.

Sidechain Polymers:

Sidechain polymers consist of asymmetric chromophores chemically attached at one point pendant to the backbone of the polymer. For example, the attachment occurs at the electron accepting end or at the electron donating end of the chromophore. Compared to guest-host systems, sidechain polymers have a much greater temporal stability at a given glass transition temperature and for a given chromophore.

Mainchain Polymers:

In mainchain polymers the chromophores are chemically attached (linked) at both ends resulting in the majority of the chromophore forming part of the backbone. The unique characteristic of this class of polymers is that the asymmetric chromophores can be linked in a head-to-tail pattern (isoregic), head-to-head pattern (syndioregic), or in a random head-to-head and head-to-tail (aregic) pattern. Because chromophores in mainchain polymers are linked at both ends in one of these three types of patterns, the chromophores have one less degree of freedom of motion relative to sidechain polymers. Therefore, mainchain chromophoric topology is, in principle, more stable than sidechain chromophoric topology.

Polar Order:

Second-order nonlinear optical properties require that the chromophore orientation in the film is noncentrosymmetric. Two primary techniques used to impart polar order in the film are elevated temperature electric-field poling and room temperature Langmuir-Blodgett processing. Recently, photopoling has been utilized for imparting polar order at room temperature for azo-containing chromophores.

Stability:

There are a number of different types of stability relevant to asymmetrical chromophores. Physical stability refers to the stability of the polar chromophore alignment to relaxation into a nonpolar state. Chemical stability refers to the integrity of the chemical structure of the chromophore, for example, against oxidation or hydrolysis. Photochemical stability refers to the stability of the chromophore to irradiation by light, especially in the presence of oxygen and water. Temporal stability refers to how well the physical, photochemical and chemical stability are maintained at a given temperature. Finally, processing stability refers to how well the polymer handles film processing procedures and various packaging operations. All of the above types of stability are critical if long term optical stability is to be achieved.

Electric-Field Poling:

Thin polymer films are prepared for poling by spin-coating a liquid solution of the polymer (about a 10 to 30% concentration) onto a solid substrate. The solvent is removed by baking the film just above the glass transition temperature (Tg). After baking, an electric field is applied across the film in one of two ways:

1) By corona poling the film on a grounded conductor plane near the film's Tg for 1 to 150 minutes.
2) By charging two electrodes contacting the film heated to Tg for 1 to 150 minutes.

Either of these processes can create an electric field of fifty to several hundred volts/micron across the film. The film is then cooled with the field on. After the external field is removed, a net alignment of dipole moments can remain locked in the film for long periods of time, providing that the temperature of the film remains well below any solid state transition, such as the Tg.

There are several problems associated with electric-field poling. First, the polymer utilized must be heated to high temperatures. At these high temperatures thermal disordering of the chromophores works against the torque of the electric field resulting in the chromophores being less well ordered. In addition, polymers containing formal charges are very difficult to pole with an electric field because the charges tend to migrate through the polymer causing dielectric breakdown (i.e. shorting out the electrode).

Langmuir-Blodgett (LB) Processing:

In conventional LB processing, the polymer molecules are designed to have hydrophilic and hydrophobic groups which cause the polymer to float on the gas-liquid interface in a preferred confirmation. These hydrophilic/hydrophobic forces are useful in removing the centrosymmetry by orienting the chromophores normal to the plane of the film.

To make films by LB processing, an organic compound is floated on a liquid, eg. water, ethylene glycol or other aqueous solutions, in a trough. A solid substrate is dipped through the gas-liquid interface depositing a single molecular layer on the substrate. Thicker films comprised of multilayers of polymers are built up by repeatedly dipping the substrate into and/or out of the trough, depositing one layer per stroke.

One of the main advantages that conventional LB processing has over electric-field poling is that LB processing may be carried out at room temperature (or lower). Furthermore, unlike electric field poling, formal ionic charges on the polymer need not hinder the ordering process.

Previous materials utilizing the LB methodology for the fabrication of waveguides (U.S. Pat. No. 5,162,453 issued Nov. 10, 1992 to Hall et al., U.S. Pat. No. 5,225,285 issued Jul. 6, 1993 to Hall et al., U.S. Pat. No. 4,830,952 issued May 16, 1989 to Penner et al, and U.S. Pat. No. 4,792,208 issued Dec. 20, 1988 to Ulman et al.) have suffered from thermal instability due to the presence of low melting alkyl and fluoroalkyl hydrophobic chains. One strategy to increase the thermal stability of LB films is the use of interlayer and/or intralayer covalent bonding (i.e. crosslinking). Another strategy is to attach chromophores to rigid polymer backbones. However, attaching sidechain chromophores to polyimides [Please refer to the following articles for more information on this subject: Thin Solid Films, 244 (1994) 754–757, and Langmuir, 10 (1994) 1160–1163] failed to provide stable multilayer NLOP films.

A limitation of LB technology is the amount of time required to build up films of sufficient thickness (>0.5 micrometers) for waveguiding. Two ways that the rate of deposition can be increased on the substrate without sacrificing film quality are:

1) Lowering monolayer viscosity by use of higher subphase temperatures, choice of subphase ions, or change of pH. [Please refer to the following for more information on this subject, "Insoluble Monolayers at Liquid-Gas Interfaces" G. L. Gaines, Interscience Publishers, New York, 1966.]
2) Utilizing alternative monolayer compression schemes such as the flowing subphase [Please refer to the following for more information on this subject, Advanced Materials 1991, 3(1), 25–31].

As mentioned earlier, the classical LB processing technique requires that the material self-assemble into noncentrosymmetric order at an interface between gas and aqueous liquid through a balance of hydrophobicity and hydrophilicity. Typically, by design, functional groups are introduced into the polymer chemical structure to bring about preferential chromophore orientation. These functional groups, especially the alkyl groups which are used for hydrophobicity, lead to a lowering of the Tg and a dilution of the concentration of chromophores. Dilution causes a lowering of the nonlinear optical coefficient of the waveguide.

This invention is unique for a number of reasons:

1) It eliminates the entire electric-field poling step.
2) It eliminates the dilution effect of the hydrophobic alkyl groups.
3) It creates stronger ionic bonds between the polymer chains.
4) It can double the rate of making films of a given thickness and of a given NLO coefficient compared to prior LB art.

BRIEF SUMMARY OF THE INVENTION

One object of this invention is to eliminate the entire electric-field poling step. In addition, another object of the invention is to produce new ionic nonlinear optic polymers comprised of asymmetric chromophores linked head-to-head by bridging groups. Furthermore, another object of the invention is to eliminate the dilution effect of the hydrophobic alkyl groups and to create stronger ionic bonds between the polymer chains. Finally, another object of the invention is to double the rate of the film deposition by depositing two polymer layers per stroke.

The polarized film has a microstructure consisting of a stack of complementary pairs of semi-ionomeric syndioregic accordion polymers. The accordion polymers are comprised of chromophores linked head-to-head and tail-to-tail (i.e., syndioregically, as described in U.S. Pat. Nos. 5,247,055 and 5,520,968) by special ionic bridging groups which are part of the present invention. The chromophores are asymmetric, with one end being electron-accepting and the other end being electron-donating. A semi-ionomeric syndioregic accordion polymer has an ionic group(s) on every other bridging group. This type of accordion polymer is contrasted to a fully ionomeric syndioregic accordion polymer that has an ionic group(s) on every bridging group. In this invention, one F-type semi-ionomeric polymer is paired with one complementary S-type semi-ionomeric polymer. Complementary is defined as both polymers having characteristics that facilitate the new method of this invention (described below) for forming a polar film in which the ionic groups from one polymer (F) bond with the ionic groups in the other polymer (S) to form a stable polymeric salt.

The F-type polymer of this invention is designed to be essentially insoluble in a liquid, typically an aqueous medium, and is designed to have the opposite ionic charge to that charge associated with the S-type polymer which is designed to be soluble in the same liquid medium. A pair of complementary polymers, [F and S], bring their ion-containing bridges in close enough proximity to form a bilayer polymeric salt at the liquid-gas interface. The bridging groups are also designed to allow the polymer backbone to fold so that the chromophores can easily lie with their long geometric axes at non-zero angles with respect to the plane of the film. Thus, to form a polar film, the ground-state dipole moments of both the F and S-type polymers are designed to point in opposite directions with respect to their respective ionic bridges, so that they will point in the same direction with respect to the plane of the film. FIG. 1 illustrates this configuration.

Another object of this invention is the method of pairwise deposition of [FS] bilayers, consisting of the above complementary semi-ionomeric syndioregic accordion polymers, to form a polarized film. In a Langmuir-Blodgett (LB) trough one complementary polymer, an S-type polymer, is completely dissolved in the liquid subphase medium. The other complementary polymer, an F-type polymer, is floated on the liquid subphase, typically an aqueous solution. The F-type polymer is essentially insoluble in the subphase. An organic solution of the F-type polymer is spread on the gas side of the liquid subphase surface, and the organic solvent evaporates into the gas or dissolves into the subphase. The liquid phase is typically aqueous and the gas utilized is typically argon to prevent oxidation of the chromophores.

The LB trough is equipped with a movable barrier(s) partially submerged in the subphase. The movable barrier is used to decrease the area occupied by the floating Langmuir layer in effect laterally compressing the layer which forces the chromophores to arrange in an orientation approaching perpendicular to the plane of the gas/liquid interface. The surface pressure at the gas-liquid interface is first increased then held constant at a value between 20% and 90% of the minimum pressure required to collapse the film at the gas-liquid interface. A solid substrate is dipped through the gas-liquid interface depositing an [FS] bilayer on the solid substrate (pair-wise deposition). The solid substrate can be oriented from 0° to 90° with respect to the surface of the gas-liquid interface, and is repeatedly dipped through the aqueous-gas interface by the Z-type or X-type deposition procedure [Please refer to U.S. Pat. No. 5,247,055 for more information regarding Z- and X-type deposition procedures] until a multilayer film comprised of from about 1 to 4000 bilayers is achieved.

Another object of this invention is a polarized film fabricated by the process described above in which the F-type polymer and the S-type polymer contribute to the second-order optical nonlinearity.

Another object of this invention is a polarized film fabricated by the process described above in which the S-type polymer is replaced by an NLO inactive polyion-containing organic compound. For example, the F-type polymer is cationic and the S-type polymer is replaced by a NLO inactive polyanion-containing organic compound or the F-type polymer is anionic and the S-type polymer is replaced by an NLO inactive polycation-containing organic compound.

For device applications wherein the polymer film is subjected to electric fields, the NLO inactive cation or NLO inactive anion must not contribute to ionic conductivity.

Finally, another object of this patent is the use of two Langmuir-Blodgett (LB) troughs in which the subphases in the troughs are aqueous solutions of S-type polymers (or NLO inactive ions), the subphase specie in one trough having the opposite charge as that in the other trough. Organic solvent solutions of aqueous-insoluble F-type polymers are injected on top of the aqueous surfaces, the floating species in one trough having a charge opposite to the species in the other trough. As the organic solvent evaporates, the moveable walls of said LB troughs compress the polymers. The surface pressures are maintained at the aqueous-gas interface between 20% and 90% of the minimum pressures required to collapse the films at the aqueous-gas interfaces. A substrate, that is oriented between 0° and 90° with respect to the surface of the gas-liquid interface, is repeatedly dipped through the aqueous-gas interface in one trough and then dipped through the aqueous-gas interface in the other trough by the Y-type deposition procedure until a multilayer film comprised of from 1 to 4000 bilayers is achieved. In this method, incorporating the Y-type procedure, [Please refer to U.S. Pat. No. 5,247,055 for a detailed discussion of the Y-type procedure] the substrate is dipped down through the interface from the gas side in one trough, and enters the subphase of the other trough through a lock. The substrate then passes up through the interface in the second trough from the liquid side. This dipping protocol continues until a film of the desired thickness is achieved.

BRIEF DESCRIPTION OF THE SEVERAL VIEWS OF THE DRAWINGS

FIG. 1: Schematic representation of typical ionic nonlinear optical polymers of this invention FIG. 2: Schematic representation of a block diagram of the Langmuir-Blodgett film deposition cycle utilized in this invention.

FIG. 3: Graph illustrating the quadratic enhancement of Second Harmonic Generation (SHG) intensity and linear increase in UV/Vis absorbance as a function of the number of polymer F and S bilayers (thickness).

FIG. 4: Schematic representation of the attenuated total reflection Fourier transform infrared (ATR FTIR) spectra for polymer F, polymer S and the bilayer FS.

FIG. 5: Floating cationic accordion polymer F on an aqueous solution of glucose phosphate subphase.

FIG. 6: Synthetic scheme used to make the nonlinear optical polymer S.

FIG. 7: Synthetic scheme used to make the nonlinear optical polymer F.

DETAILED DESCRIPTION OF THE INVENTION

One embodiment of this invention, see Diagram 1 below, is a polarized film consisting of at least one pair of polymers (a molecular bilayer), comprising two monolayers of semi-ionic, head-to-head, mainchain, chromophoric accordion polymers ionically bonded to one another. One of the molecular layers being formed of an F-type polymer, which during the fabrication of the film, floats on a liquid subphase of a Langmuir-Blodgett trough, and is essentially insoluble in the subphase. The other molecular layer being formed of an S-type polymer which is soluble in the subphase. Both polymers F and S are semi-ionically charged, one having the opposite charge of the other, and having the formulas:

DIAGRAM #1

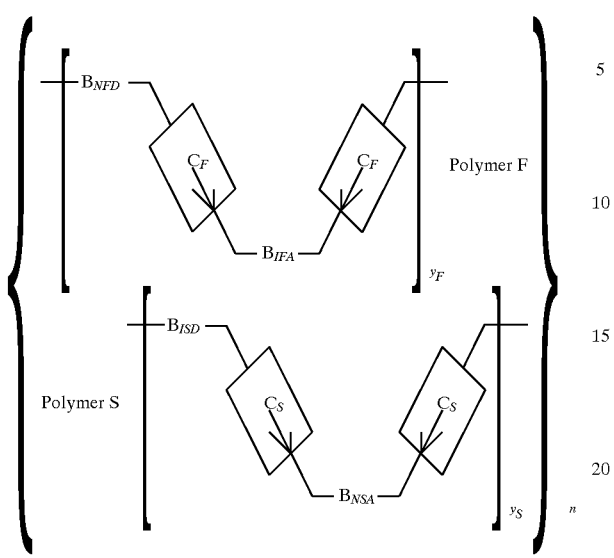

in which:

n is the number of bilayers stacked one upon another making up the thickness of the film and can be from 1 to 4000; $C_F$ and $C_S$ are chromophores of polymers F and S, respectively. The chromophores have an electron accepting group at the end represented by an arrow head, and an electron donating group at the other end, and a rigid connecting group which contains delocalized π-electrons which is connected between the electron accepting end and the electron donating end of the chromophores.

$B_{NFD}$ is a nonionic bridging group extending between and being part of the electron donating ends of two $C_F$ chromophores.

$B_{IFA}$ is an ionic bridging group extending between and being part of the electron accepting ends of two $C_F$ chromophores.

$B_{NSA}$ is a nonionic bridging group extending between and being part of the electron accepting ends of two $C_S$ chromophores.

$B_{ISD}$ is an ionic bridging group having the opposite charge of $B_{IFA}$ and extending between and being part of the electron donating ends of two $C_S$ chromophores; $y_F$ and $y_S$ are degrees of polymerization of polymers F and S respectively, which independently range from a minimum value of 2 to a maximum value of about 300.

Another embodiment of this invention, see Diagram 2 below, in which the polar axis of the chromophores is pointing in the opposite direction relative to the bilayer shown in Diagram 1, is a polarized film consisting of at least one pair of polymers (a molecular bilayer), comprising two monolayers of semi-ionic, head-to-head, mainchain, chromophoric accordion polymers ionically bonded to one another. One of the molecular layers being formed of an F'-type polymer, which during the fabrication of the film, floats on a liquid subphase of a Langmuir-Blodgett trough, and is essentially insoluble in the subphase. The other molecular layer being formed of an S'-type polymer which is soluble in the subphase. Both polymers F' and S' are semi-ionically charged, one having the opposite charge of the other, and having the formulas:

DIAGRAM #2

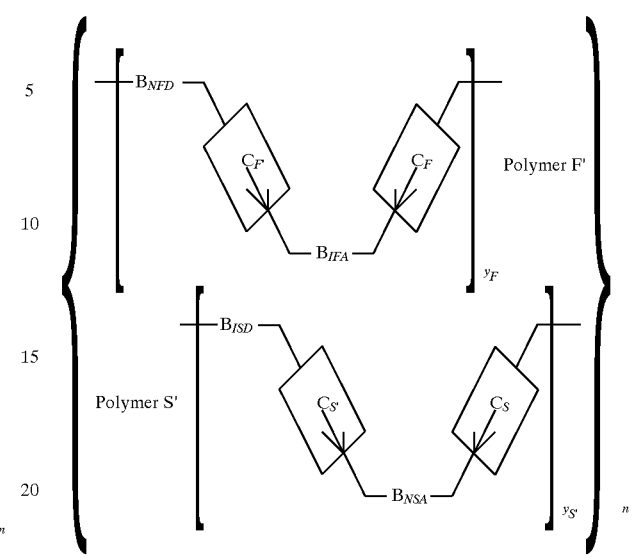

in which:

n is the number of bilayers stacked one upon another making up the thickness of the film and can be from 1 to 4000; $C_F'$ and $C_S'$ are chromophores of polymers F' and S', respectively. The chromophores have an electron accepting group at the end represented by an arrow head, and an electron donating group at the other end, and a rigid connecting group which contains delocalized π-electrons which is connected between the electron accepting end and the electron donating end of the chromophores.

$B_{NFA}$ is a nonionic bridging group, extending between and being part of the electron accepting ends of two $C_F'$ chromophores.

$B_{IFD}$ is an ionic bridging group, extending between and being part of the electron donating ends of two $C_F'$ chromophores.

$B_{NSD}$ is a nonionic bridging group, extending between and being part of the electron donating ends of two $C_S'$ chromophores.

$B_{ISA}$ is an ionic bridging group having the opposite charge of $B_{IFD}$ and extending between and being part of the electron accepting ends of two $C_S'$ chromophores; $y_F'$ and $y_S'$ are degrees of polymerization of polymers F' and S' respectively, which independently range from a minimum value of 2 to a maximum value of about 300.

The cationic electron-accepting bridging groups ($B_{ISA}$) in polymer S', and cationic electron-accepting bridging groups ($B_{IFA}$) in polymer F, can be independently selected from the group consisting of:

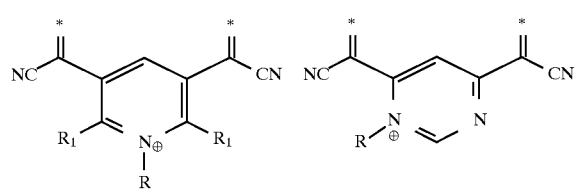

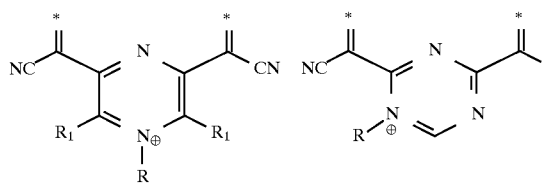

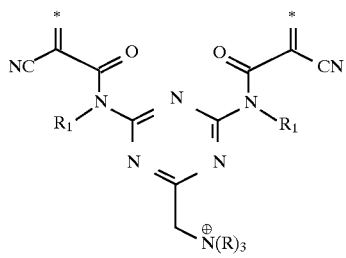

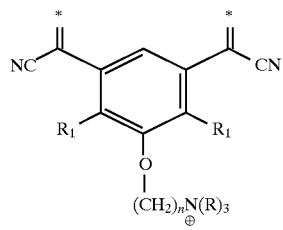

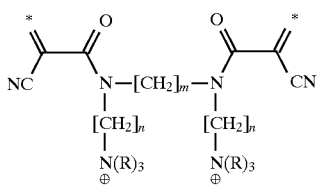

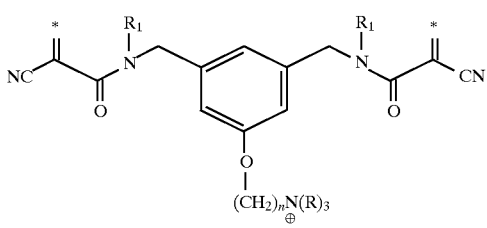

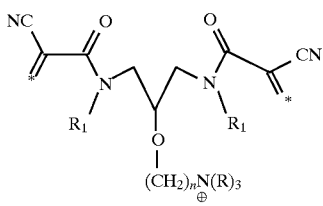

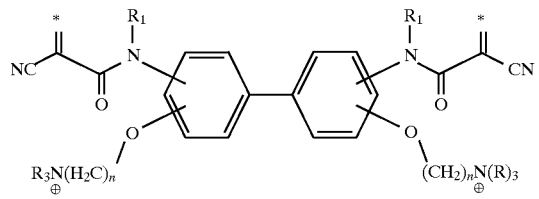

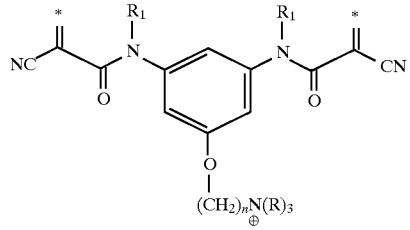

in which:

* designates a point of attachment between the bridging group and a rigid connecting group;

R is methyl, ethyl, propyl, hydroxyethyl, or benzyl;

$R_1$ is hydrogen, methyl, ethyl, propyl, or allyl; and n and m are independently 2 or 3.

In the soluble forms of polymers F, F', S and S', the counter ions for the cationic polymers can be any common monovalent anion such as chloride, bromide or tosylate. For the anionic polymers, the soluble forms of the polymers F, F', S and S' can be any common monovalent cation such as lithium, sodium or ammonium.

The nonionic electron-donating bridging groups ($B_{NSD}$) in polymer S' and nonionic electron-donating bridging groups ($B_{NFD}$) in polymer F can be independently selected from the group consisting of:

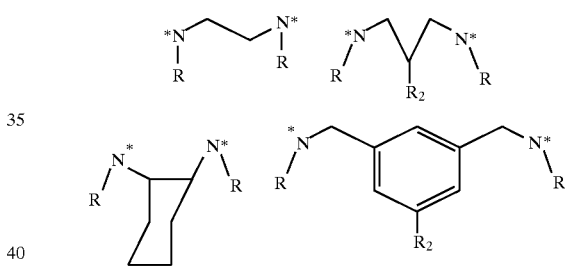

in which:

* designates a point of attachment between the bridging group and a rigid connecting group;

R is methyl, ethyl, propyl, allyl, hydroxyethyl, or benzyl; and $R_2$ is hydrogen, hydroxyl, methoxyl, ethoxyl, acrylate, methacrylate, or oxohydroxyethyl.

The nonionic electron-accepting bridging groups ($B_{NSA}$) in polymer S and nonionic electron-accepting bridging groups ($B_{NFA}$) in polymer F' can be selected from the group consisting of:

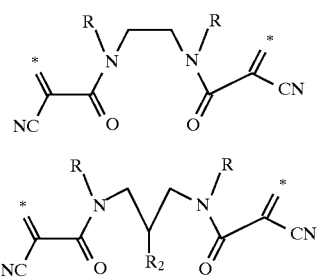

-continued

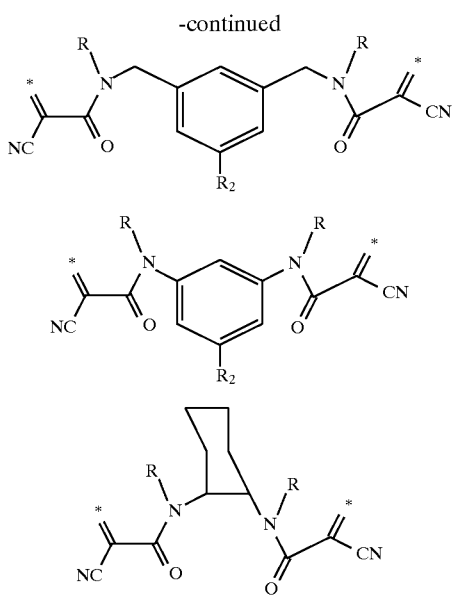

in which:
designates a point of attachment between the bridging group and a rigid connecting group;
R is hydrogen, methyl, ethyl, propyl, allyl, hydroxymethyl, hydroxyethyl, or benzyl; and
$R_2$ is hydrogen, hydroxyl, methoxyl, ethoxyl, acrylate, methacrylate, or oxohydroxyethyl.

The anionic electron-donating bridging groups ($B_{IFD}$) in polymer F', and anionic electron-donating bridging groups ($B_{ISD}$) in polymer S can be selected from the group consisting of:

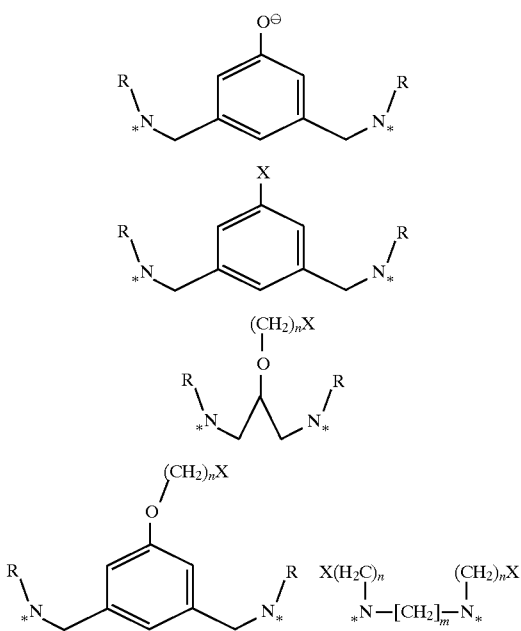

in which:
* designates a point of attachment between the bridging group and a rigid connecting group; R is methyl, ethyl, propyl, allyl, hydroxyethyl, or benzyl; X is selected from the group consisting of sulphonate $(SO_3)^-$, carboxylate $(CO_2)^-$ and phosphonate $(PO_4)^{2-}$; and n is 2 or 3.

The cationic electron-donating bridging groups ($B_{ISD}$) in polymer S, and cationic electron-donating bridging groups ($B_{IFD}$) in polymer F' can be selected from the group consisting of:

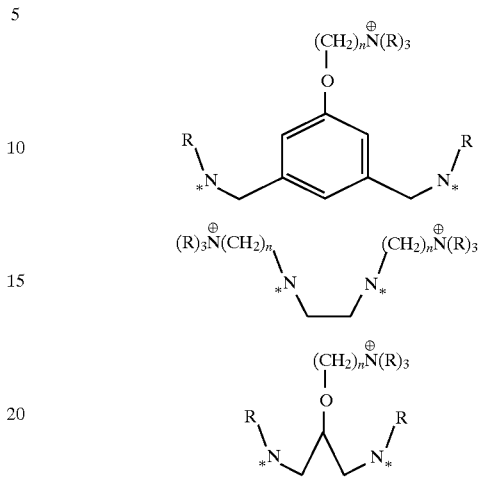

in which:
* designates a point of attachment between the bridging group and a rigid connecting group;
R is methyl, ethyl, propyl, hydroxyethyl, or benzyl; and n is 2 or 3.

The anionic electron-accepting bridging groups ($B_{IFA}$) in polymer F and anionic electron-accepting bridging groups ($B_{ISA}$) in polymer S' can be independently selected from the group consisting of:

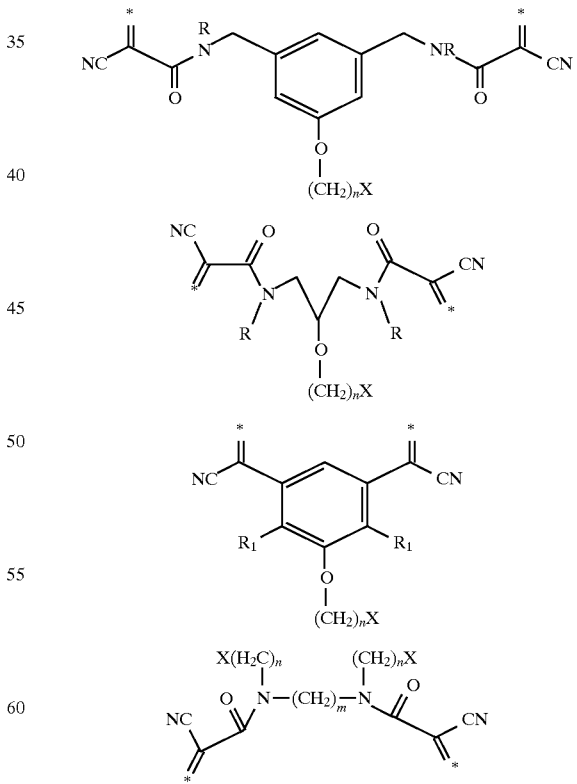

in which:
* designates a point of attachment between the bridging group and a rigid connecting group;

R is hydrogen, methyl, ethyl, propyl, allyl, hydroxyethyl, or benzyl;

$R_1$ is hydrogen or methyl;

X is selected from the group consisting of sulphonate $(SO_3)^-$, carboxylate $(CO_2)^-$ and phosphonate $(PO_4)^{2-}$; and n is 2 or 3.

The rigid connecting groups of the chromophore $C_F$ and $C_S$, are independently selected from the group consisting of:

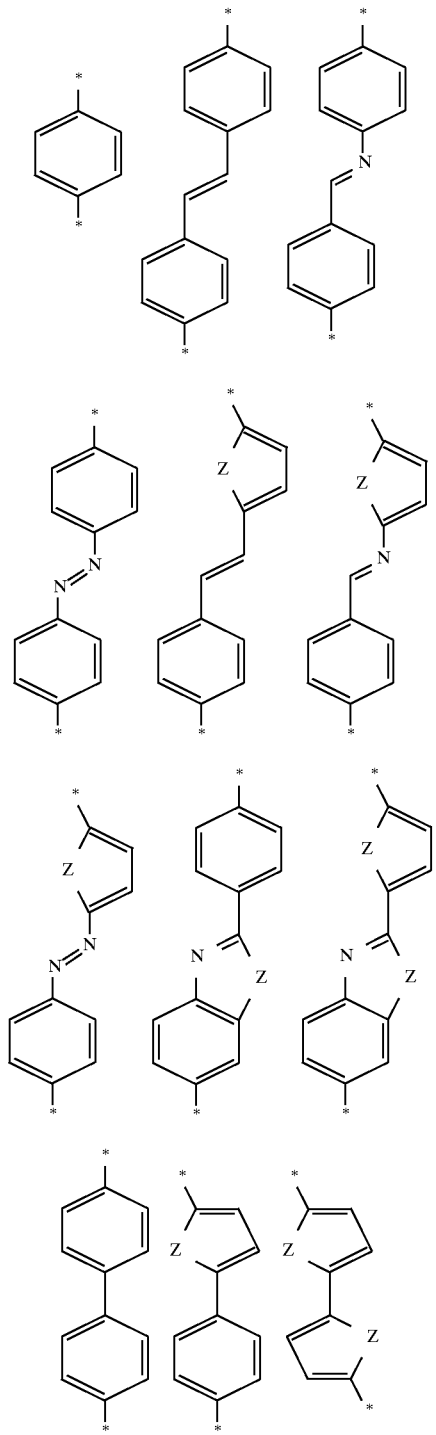

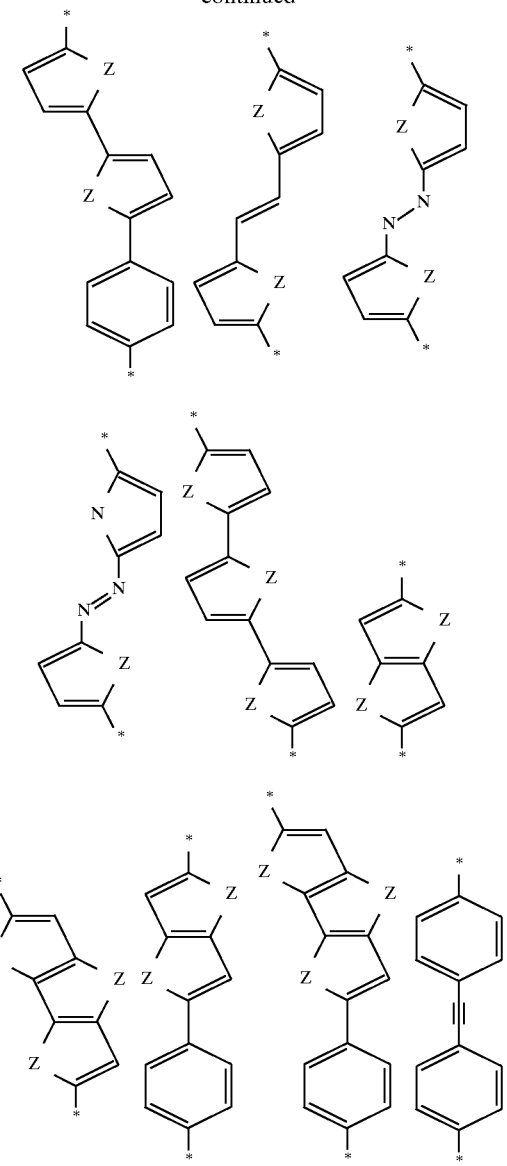

in which:

* designates a point of attachment between the bridging group and a rigid connecting group; and Z can be independently chosen from thio ether (S), ether (O), or an amine (NH).

For the case where F-type or F'-type polymer is cationic, the S-type or S'-type polymer can be replaced by glucose phosphate, 2,6-naphthalenedisulfonate, aqueous-soluble organodisulfonates, aqueous-soluble organodicarboxylates, aqueous-soluble organophosphates, or nonlinear optical (NLO)-inactive polyanion-containing organic compounds.

For the case where the F-type or F'-type polymer is anionic, the S-type or S'-type polymer can be replaced by aqueous-soluble dialkyl bipyridiniums or NLO-inactive polycation-containing organic compounds.

The following examples are provided to further illustrate this invention.

EXAMPLE 1

The following illustrates the synthesis of polymer S. Please refer to FIG. 6 for the schematic.

Compound A, 0.4155 grams (0.001 mole), 0.1935 grams of compound B (0.001 mole) and 0.25 g of dimethyl aminopyridine (DMAP) (0.0022 mole) were dissolved in 20 ml of pyridine and heated to 120° C. After 4 days the degree of polymerization by NMR was estimated to be approximately 5, and remained unchanged for 3 more days. At this point 0.01 grams (0.00005 moles) more of compound B was added and the solution heated for 8 more days. After the additional 8 days, the degree of polymerization was estimated to be at least 13. The solution was then cooled and precipitated into absolute ethanol and stirred over night, then filtered and dried. The residue was re-dissolved into pyridine and precipitated again into absolute ethanol, filtered and dried in vacuo to give 0.33 g (59%) of polymer NS (the neutral form of polymer S). The glass transition temperature ($T_g$) of the polymer was found to be 188° C. and the average molecular weight was found to be 9,220 g/mol (DP=16).

Conversion of phenol to phenoxide ion.

Polymer NS (above), 0.15 grams, was dissolved in 4 ml of DMSO. Lithium hydroxide hydrate, 0.015 grams, was added and the solution stirred. An additional 246 ml of DMSO was added to bring the final concentration of phenoxide ions to 0.001 moles/liter.

EXAMPLE 2

The following illustrates the synthesis of Polymer F. Please refer to FIG. 7 for the schematic.

Polymerization of compound C with compound D to give Polymer NF (the neutral form of Polymer F):

A 50 mL round bottom flask was charged with 0.15 g (0.81 mmol) of compound D and 0.29 g (0.81 mmol) of compound C [bis (p-xylyl ethanolaminoaldehyde)] dissolved in 7 mL of dry pyridine. A catalytic amount (5 drops) of piperidine was added and the mixture was kept at 125° C. for 4.5 days under positive nitrogen pressure. The solution was cooled then added drop-wise into an excess of methanol (about 200 mL) and the precipitated polymer was filtered, dried to yield 0.3 g (80%) of a yellow powder. Polymer NF (The neutral form of Polymer F) $^1$H NMR and $^{13}$C NMR confirmed the product was obtained. The average molecular weight was determined to be 4175 g/mol (Dp=8). Thermal analysis showed the Tg was 173.0° C. and the Td (2 wt. % loss) was 330° C.

Methylation of Polymer NF to give polymer F:

A 10 mL round bottom flask was charged with 3.0 mL of dimethylsulfoxide, 90 mg (0.2 mmol) of Polymer NF and 26.7 mg (0.2 mmol) of iodomethane. The solution was stirred at ambient temperature for 3 days under nitrogen. The solution was added drop-wise to diethylethers (about 75 mL) and a brown oil precipitated from the ethereal solution. The ethereal solution was decanted and the brown oil dried to yield a brown glassy powder (80 mg, 72%, Polymer F). $^1$H NMR showed the product was 75% methylated to the pyridinium accordion ionomer.

EXAMPLE 3

In order to illustrate that polymer S is incorporated as a monolayer during each dipping cycle during the multilayer film fabrication method of this invention, the following experiment was undertaken.

The attenuated total reflection Fourier transform infrared (ATR FTIR) spectra (FIG. 4) were obtained with a Nicolet 60sx with 4 cm$^{-1}$ resolution. Si and ZnSe ATR crystals were used as substrates. The crystals were cleaned with DMSO, ethanol, and finally with chloroform before the background spectra were obtained. The end faces of the ATR crystals were wrapped with polytetrafluoroethylene (PTFE) tape before the film deposition.

The LB film of polymer F for the FTIR study was prepared by the following procedure. A chloroform/pyridine (3:1) solution of F was spread at an argon/water interface. The polymer monolayer was compressed symmetrically at a barrier speed of 10 cm$^2$/min to a surface pressure of 15 mN/m. The ZnSe ATR crystal was moved on the upstroke through the polymer film at 1.5 mm/min.

The solution adsorption films of polymer S for FTIR study were prepared by immersing the ATR crystals in a beaker of 10$^{-4}$M aqueous solution of polymer S for 30 minutes under argon gas and protected from room light. Solution adsorption tests showed that Polymer S will adsorb to the ZnSe but will not adsorb to the Si. Thus, the Si ATR crystal was chosen as the substrate for the bilayer deposition.

The [F/S] bilayer film for FTIR study was prepared by the following procedure. The Si ATR crystal was held at the bottom of the dipstroke in a subphase of 10$^{-4}$M aqueous solution of polymer S during spreading, equilibrating and initial compressing of polymer F on the surface of the subphase. Once the system reached the target surface pressure, the substrates were moved on the upstroke at 1.5 mm/min through the argon-aqueous solution interface. The sample was rinsed with ultrapure water and dried under nitrogen before the FTIR spectrum was obtained.

FIG. 4 shows the FTIR ATR spectra for each individual polymer. Polymer S exhibits a strong absorbance at 1605 cm$^{-1}$. Polymer F has a characteristic band at 1587 cm$^{-1}$. The bilayer spectra contains the characteristic bands of both polymers.

EXAMPLE 4

Films were made using a rectangular Langmuir-Blodgett (LB) minitrough (NIMA, Coventry). The trough was kept in a glove bag (Aldrich, Milwaukee) with argon gas at a temperature of 24° C. during the bilayer depositions. The substrates were glass slides (Fisher, Catalogue #12-550A) cut to 1.5 cm×2.5 cm and cleaned with a solution consisting of 30% H$_2$O$_2$ in concentrated H$_2$SO$_4$. For dipping, 2 substrates were clamped back-to-back so that material was deposited on one side of each substrate. Under argon, a 0.026M solution of Polymer S in dimethylsulfoxide was diluted to 10$^{-4}$ anionic repeat units per liter of solution with water from a Barnstead Nanopure water purification system (17.9 Mohms resistivity, 0.2 micron filter). The trough was filled with the 10$^{-4}$M solution of Polymer S (pH 5.5). A chloroform/pyridine (3:1) solution of Polymer F was spread at the argon/aqueous solution interface. The system was allowed to equilibrate for 1 hour before the polymer bilayer was compressed symmetrically at a barrier speed of 10 cm$^2$/min at a surface pressure of 15 mN/m.

The deposition procedure took place as follows (FIG. 2). The substrates were held at the bottom of the dipstroke during the equilibration and initial compression of the bilayer. Once the system reached the target surface pressure of 15 mN/m, the substrates were moved on the upstroke at 1.5 mm/min. When the substrates reached the top of the stroke, the barriers were moved back at maximum speed until the surface pressure was approximately 0 mN/m. The substrates were then moved on the downstroke at 100 mm/min to minimize the transfer of material. Subsequent bilayers were built up on the substrates by repeating this deposition procedure until a target thickness of 4 bilayers was achieved.

17
EXAMPLE 5

UV-Visible Spectroscopy and Second Harmonic Generation Characterization of the Film The transmission UV-Vis spectra of the films were obtained with a Cary 5 NIR-Vis-UV spectrophotometer. The films were referenced to air, and the glass background was subtracted to obtain the film spectra (FIG. 3).

Second harmonic generation (SHG) measurements were made in transmission with an incident beam at 54° from normal. The SHG signal was generated by transmission of a fundamental beam from a Q-switched Nd:YAG laser (pulse width of 10 ns and repetition rate of 10 Hz) at an incident angle of 54° from normal. The SHG signal was detected with an intensified Si diode array (Tracor Northern) (FIG. 3).

EXAMPLE 6

Deposition of Polymer F/Glucose Phosphate Bilayers

LB films were made using a circular alternate layer trough (NIMA, Coventry). The trough was kept in a glove box continuously purged with nitrogen gas during the LB film depositions at 24° C. The substrates were 1"×3" glass slides (Fisher, Cat. # 12-550A) cleaned with $H_2SO_4/H_2O_2$. For dipping, the substrate was clamped to a slide holder such that material was deposited on only one side of the substrate. The trough was filled with the $10^{-3}$M solution of glucose phosphate disodium salt (Aldrich) (pH=5.5). A chloroform/pyridine (3:1) solution of polymer F was spread at the nitrogen/aqueous solution interface in one compartment of the alternate layer trough (The second compartment contained only the aqueous solution. That is, no polymer was spread in the second compartment; hereinafter referred to as the clean compartment). The system was allowed to equilibrate for 1 hour before the polymer film was compressed asymmetrically at a barrier speed of 10 $cm^2$/min to a surface pressure of 15 mN/m.

The film deposition was performed using the following procedure. The substrates were held in the nitrogen atmosphere during the equilibration and initial compression of the polymer film. Once the system reached the target surface pressure, the substrates were moved down into the aqueous subphase in the clean compartment. Film deposition occurred as the substrate was moved on the upstroke at 3 mm/min out of the first compartment. Subsequent bilayers were built up on the substrates by repeating this procedure.

The transmission UV-Vis spectra of the films were obtained with a Cary 5 NIR-Vis-UV spectrophotometer. The films were referenced to air and the glass background was subtracted to obtain the film spectra.

Second Harmonic Generation (SHG) measurements were made in transmission with an incident beam at 54° from normal. The SHG signal was generated by transmission of a fundamental beam from a Q-switched Nd:YAG laser (pulse width of 10 ns and repetition rate of 10 Hz) at an incident angle of 54° from normal. The SHG signal was detected with an intensified Si diode array (Tracor Northern).

The UV absorbance and the SHG intensity as a function of films thickness are plotted in FIG. 5.

18

What is claimed is:

1. A polarized film, comprising:

at least one molecular bilayer having the formula:

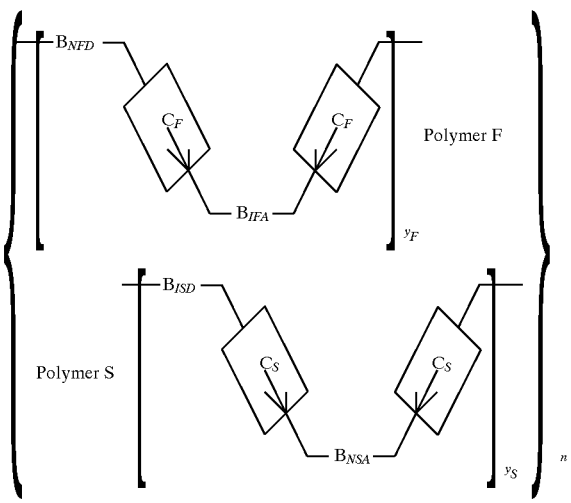

wherein:

n the number of bilayers, is from 1 to 4000;

F is a semi-ionic mainchain, head-to-head chromophoric polymer which during the fabrication of the film floats on a liquid subphase of a Langmuir-Blodgett trough and is essentially insoluble in said subphase;

S is a semi-ionic mainchain, head-to-head chromophoric polymer which is soluble in said subphase; said F polymers having the opposite charge of said S polymers;

$C_F$ and $C_S$ are chromophores of polymers F and S, respectively, and wherein, said chromophores have an electron accepting group at the end represented by an arrow head, and an electron donating group at the other end, and a rigid connecting group which contains delocalized p-electrons and which is connected between the electron accepting end and the electron donating end of said chromophores;

$B_{NFD}$ is a nonionic bridging group, extending between and being part of said electron donating ends of two $C_F$ chromophores;

$B_{IFA}$ is an ionic bridging group, extending between and being part of said electron accepting ends of two $C_F$ chromophores;

$B_{NSA}$ is a nonionic bridging group, extending between and being part of said electron accepting ends of two $C_S$ chromophores;

$B_{ISD}$ is an ionic bridging group having the opposite charge of $B_{IFA}$, extending between and being part of the electron donating ends of two $C_S$ chromophores; and $y_F$ and $y_S$ are degrees of polymerization of polymers F and S respectively, which independently range from a minimum value of 2 to a maximum value of about 300.

2. A polarized film, as described in claim 1, wherein the cationic electron-accepting bridging groups ($B_{IFA}$) in polymer F, is independently selected from the group consisting of:

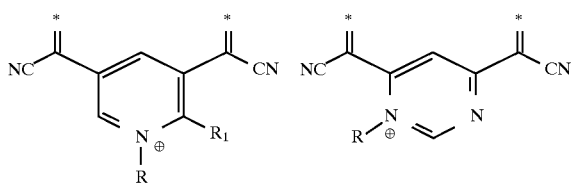
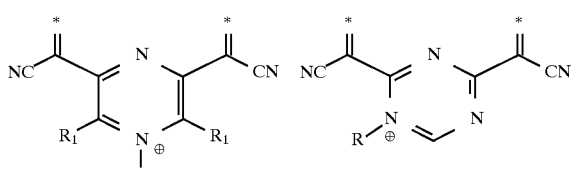
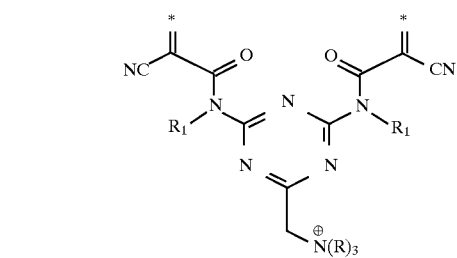
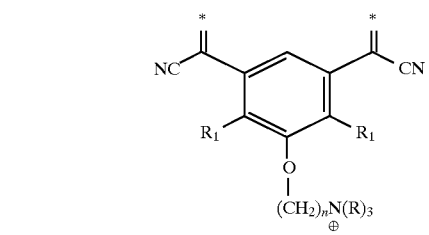
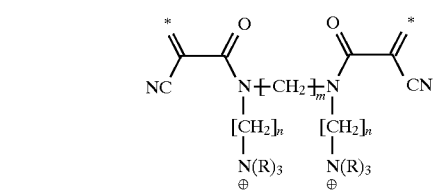
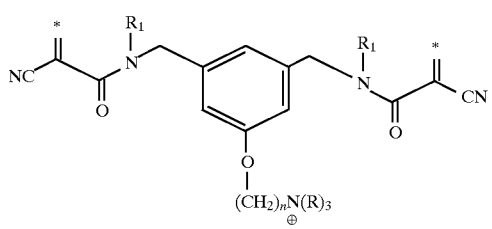
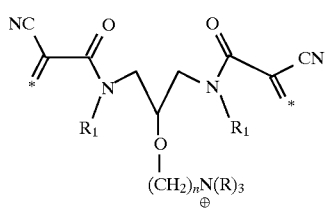

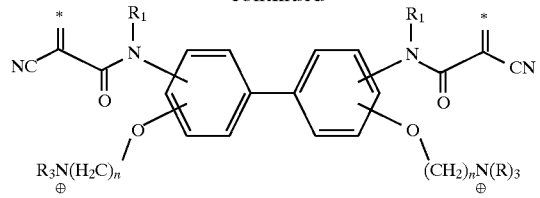
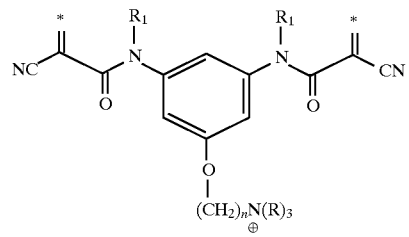

wherein:
* designates a point of attachment between the bridging group and a rigid connecting group;
R is selected from the group consisting of methyl, ethyl, propyl, hydroxyethyl and benzyl;
$R_1$ is selected from the group consisting of hydrogen, methyl, ethyl, propyl and allyl; and
n and m are independently 2 or 3.

3. A polarized film, as described in claim 1, wherein the nonionic electron-donating bridging groups ($B_{NFD}$) in polymer F is independently selected from the group consisting of:

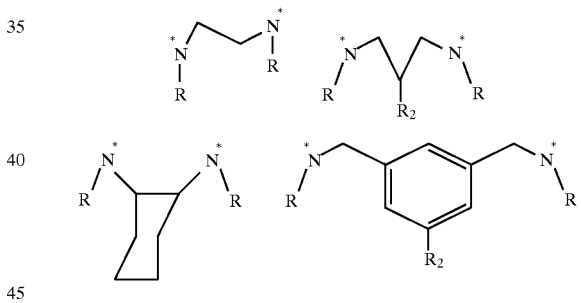

wherein:
* designates a point of attachment between the bridging group and a rigid connecting group;
R is selected from the group consisting of methyl, ethyl, propyl, allyl, hydroxyethyl and benzyl; and
$R_2$ is selected from the group consisting of hydrogen, hydroxyl, methoxyl, ethoxyl, acrylate, methacrylate and oxohydroxyethyl.

4. A polarized film, as described in claim 1, wherein the nonionic electron-accepting bridging groups ($B_{NSA}$) in polymer S is selected from the group consisting of:

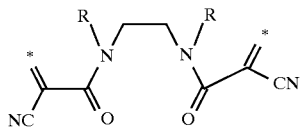

-continued

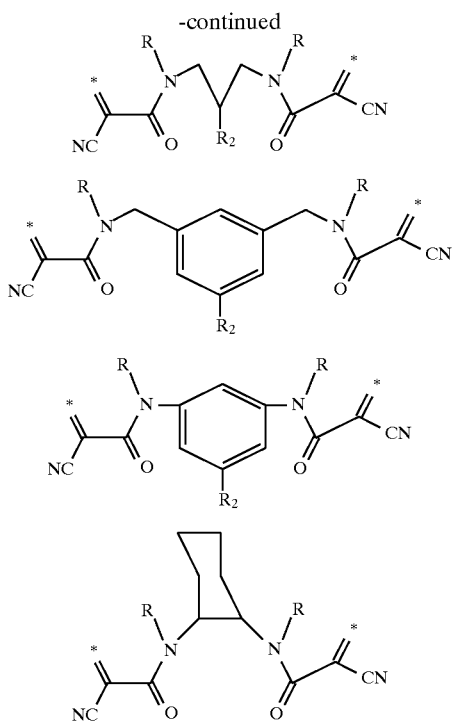

wherein:
- designates a point of attachment between the bridging group and a rigid connecting group;
- R is selected from the group consisting of hydrogen, methyl, ethyl, hydroxymethyl and hydroxyethyl; and
- $R_2$ is selected from the group consisting of hydrogen, hydroxyl, methoxyl, ethoxyl, acrylate, methacrylate and oxohydroxyethyl.

5. A polarized film, as described in claim 1, wherein the anionic electron-donating bridging groups ($B_{ISD}$) in polymer S is selected from the group consisting of:

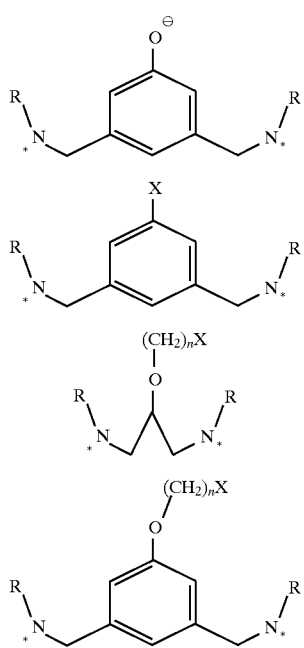

-continued

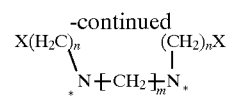

wherein:
- \* designates a point of attachment between the bridging group and a rigid connecting group;
- R is selected from the group consisting of methyl, ethyl, propyl, allyl, hydroxyethyl and benzyl;
- X is selected from the group consisting of sulphonate $(SO_3)^-$, carboxylate $(CO_2)^-$ and phosphonate $(PO_4)^{2-}$; and
- n and m are independently 2 or 3.

6. A polarized film, as described in claim 1, wherein the cationic electron-donating bridging groups ($B_{ISD}$) in polymer S is selected from the group consisting of:

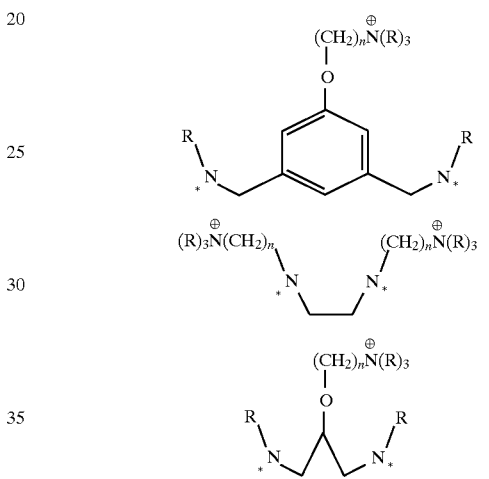

wherein:
- \* designates a point of attachment between the bridging group and a rigid connecting group;
- R is selected from the group consisting of methyl, ethyl, and hydroxyethyl; and
- n is 2 or 3.

7. A polarized film, as described in claim 1, wherein the anionic electron-accepting bridging groups ($B_{IFA}$) in polymer F is independently selected from the group consisting of:

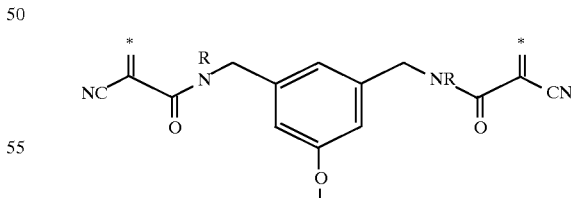

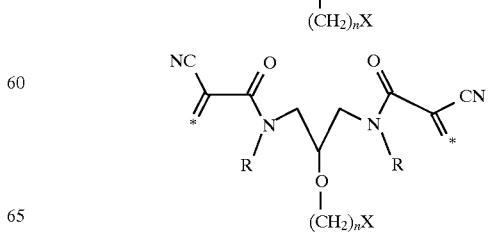

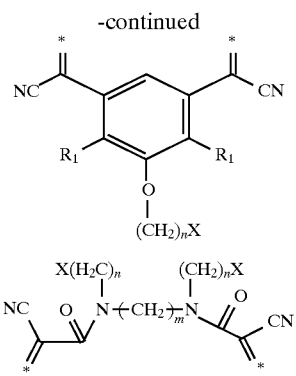

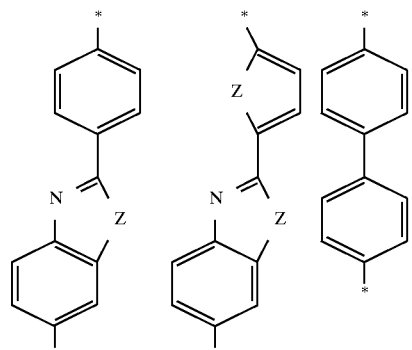

wherein:
- \* designates a point of attachment between the bridging group and a rigid connecting group;
- R is selected from the group consisting of hydrogen, methyl, ethyl, propyl, allyl, hydroxyethyl and benzyl;
- $R_1$ is hydrogen or methyl;
- X is selected from the group consisting of sulphonate $(SO_3)^-$, carboxylate $(CO_2)^-$ and phosphonate $(PO_4)^{2-}$; and
- n and m are independently 2 or 3.

8. A polarized film, as described in claim 1, wherein at least one of the rigid connecting groups of the chromophore $C_F$ and $C_S$, are independently selected from the group consisting of:

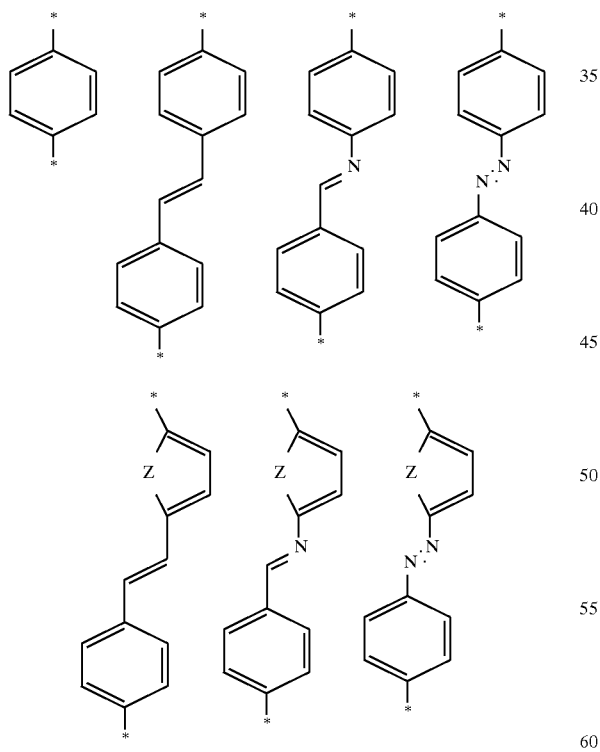

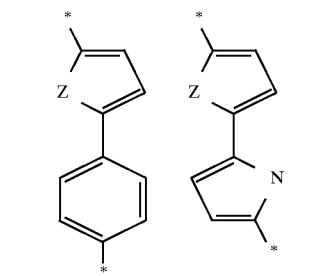

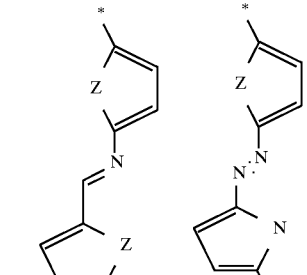

-continued

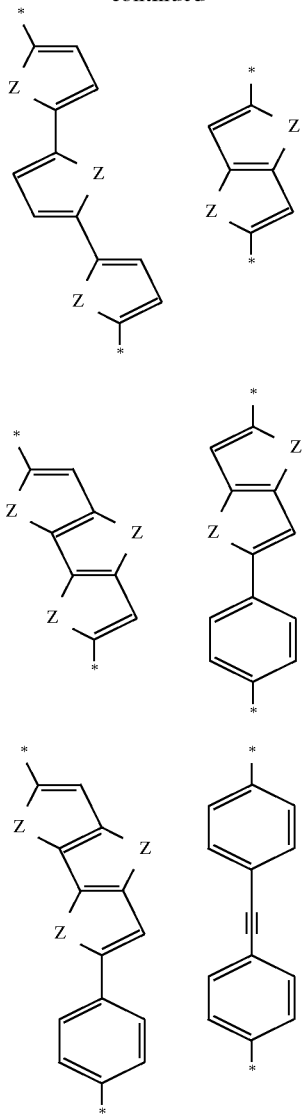

wherein,
* designates a point of attachment between the bridging group and a rigid connecting group; and
Z is independently selected from the group consisting of thio ether (S), ether (o), and an amine (NH).

9. A method for making the polar films of claim 1, comprising the steps of:
utilizing a Langmuir-Blodgett trough in which the subphase of said trough is an aqueous solution of said S polymer;
spreading a non-aqueous solution of said F polymer on said subphase;
waiting about 1 to 60 minutes for said molecular bilayer to form;
compressing said molecular bilayer with one or more moveable walls of said LB trough while maintaining the surface pressure at the gas-liquid interface between 20% and 90% of the minimum pressure required to collapse said molecular bilayer film; and
dipping, repeatedly, a substrate oriented between 0° and 90° with respect to the surface of the gas-liquid interface, through the aqueous-gas interface by the Z- or X-type deposition procedure until said multilayer film comprised of from 1 to about 4000 bilayers is achieved.

10. A polarized film, comprising:
at least one molecular bilayer having the formula:

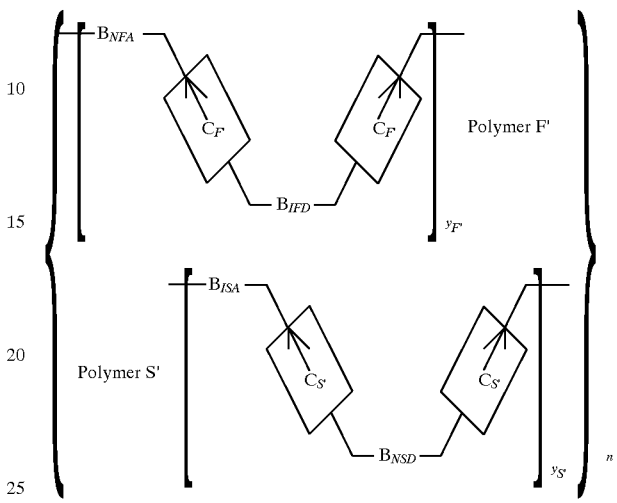

wherein:
n the number of bilayers, is from 1 to 4000;
F' is a semi-ionic mainchain, head-to-head chromophoric polymer which during the fabrication of the film floats on a liquid subphase of a Langmuir-Blodgett trough and is essentially insoluble in said subphase;
S' is a semi-ionic mainchain, head-to-head chromophoric polymer which is soluble in said subphase; said F' polymers having the opposite charge of said S' polymers;
$C_F'$ and $C_S'$ are chromophores of polymers F' and S', respectively, and wherein, said chromophores have an electron accepting group at the end represented by an arrow head, and an electron donating group at the other end, and a rigid connecting group which contains delocalized p-electrons and which is connected between the electron accepting end and the electron donating end of said chromophores;
$B_{NFA}$ is a nonionic bridging group, extending between and being part of said electron accepting ends of two $C_F'$ chromophores;
$B_{IFD}$ is an ionic bridging group, extending between and being part of said electron donating ends of two $C_F'$ chromophores;
$B_{NSD}$ is a nonionic bridging group, extending between and being part of said electron donating ends of two $C_S'$ chromophores;
$B_{ISA}$ is an ionic bridging group having the opposite charge of $B_{IFD}$, extending between and being part of the electron accepting ends of two $C_S'$ chromophores;
$y_F'$ and $y_S'$ are degrees of polymerization of polymers F' and S' respectively, which independently range from a minimum value of 2 to a maximum value of about 300.

11. A polarized film, as described in claim 10, wherein the cationic electron-accepting bridging groups ($B_{ISA}$) in polymer S' is independently selected from the group consisting of:

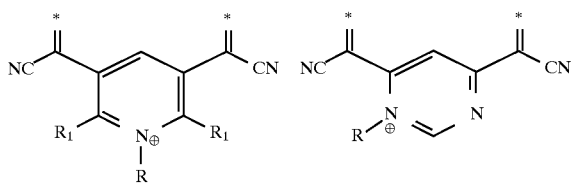
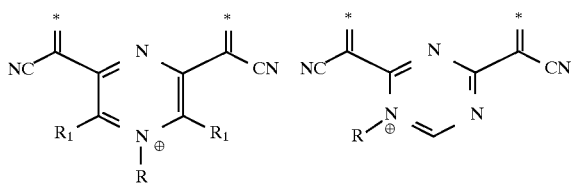
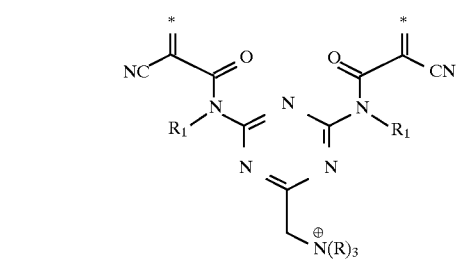
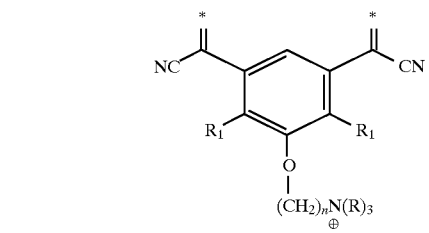
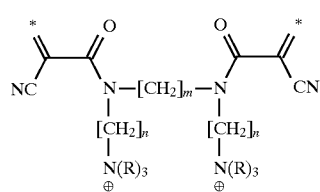
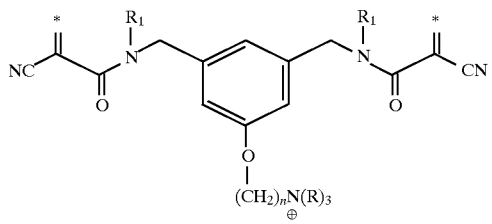
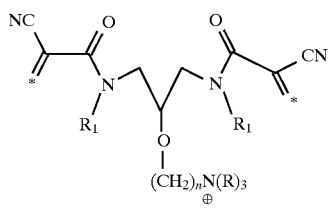

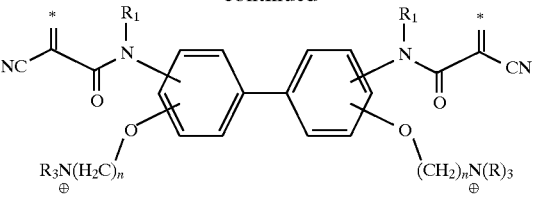
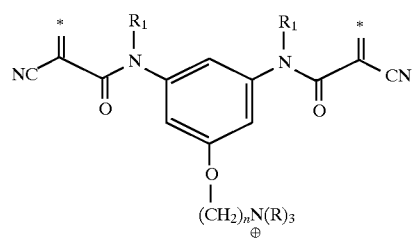

wherein:
* designates a point of attachment between the bridging group and a rigid connecting group;
R is selected from the group consisting of methyl, ethyl, propyl, hydroxyethyl and benzyl;
$R_1$ is selected from the group consisting of hydrogen, methyl, ethyl, propyl and allyl; and
n and m are independently 2 or 3.

12. A polarized film, as described in claim 10, wherein the nonionic electron-donating bridging groups ($B_{NSD}$) in polymer S' is independently selected from the group consisting of:

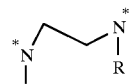
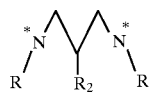
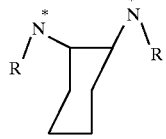
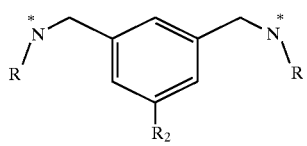

wherein:
* designates a point of attachment between the bridging group and a rigid connecting group;
R is selected from the group consisting of methyl, ethyl, propyl, allyl and hydroxyethyl;
$R_2$ is selected from the group consisting of hydrogen, hydroxyl, methoxyl, ethoxyl, acrylate, methacrylate and oxohydroxyethyl.

13. A polarized film, as described in claim 10, wherein the nonionic electron-accepting bridging groups ($B_{NFA}$) in polymer F' is selected from the group consisting of:

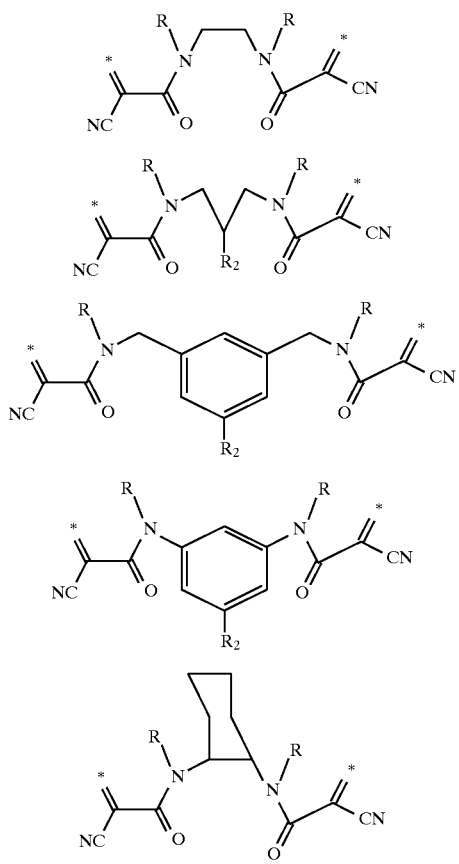

wherein:
* designates a point of attachment between the bridging group and a rigid connecting group;
R is selected from the group consisting of hydrogen, methyl, ethyl, propyl, allyl, hydroxymethyl, hydroxyethyl and benzyl; and
$R_2$ is selected from the group consisting of hydrogen, hydroxyl, methoxyl, ethoxyl, acrylate, methacrylate and oxohydroxyethyl.

14. A polarized film, as described in claim 10, wherein the anionic electron-donating bridging groups ($B_{IFD}$) in polymer F' is selected from the group consisting of:

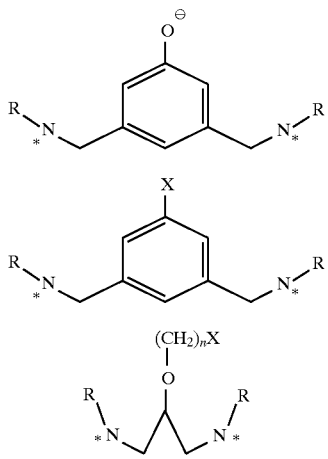

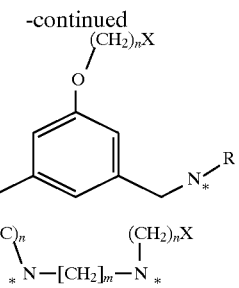

wherein:
* designates a point of attachment between the bridging group and a rigid connecting group;
R is selected from the group consisting of methyl, ethyl, propyl, allyl, hydroxyethyl and benzyl;
X is selected from the group consisting of sulphonate $(SO_3)^-$, carboxylate $(CO_2)^-$ and phosphonate $(PO_4)^{2-}$; and
n and m are independently 2 or 3.

15. A polarized film, as described in claim 10, wherein the cationic electron-donating bridging groups ($B_{IFD}$) in polymer F' is selected from the group consisting of:

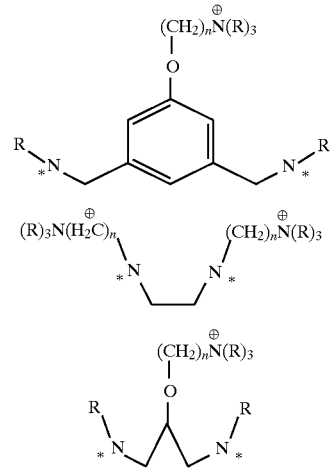

wherein:
* designates a point of attachment between the bridging group and a rigid connecting group;
R is selected from the group consisting of methyl, ethyl, propyl, allyl, hydroxyethyl and benzyl; and
n is 2 or 3.

16. A polarized film, as described in claim 10, wherein the anionic electron-accepting bridging groups ($B_{ISA}$) in polymer S' is independently selected from the group consisting of:

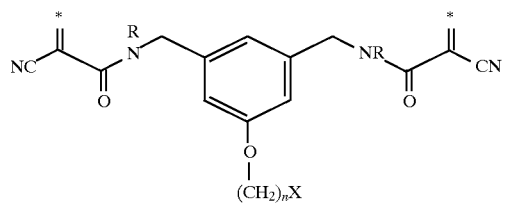

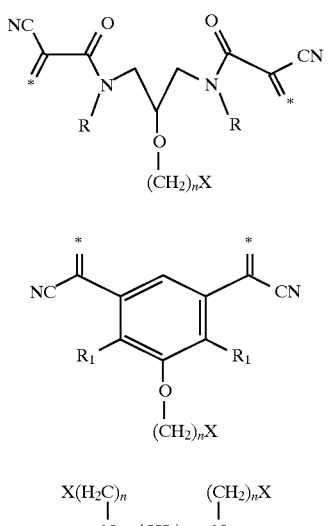

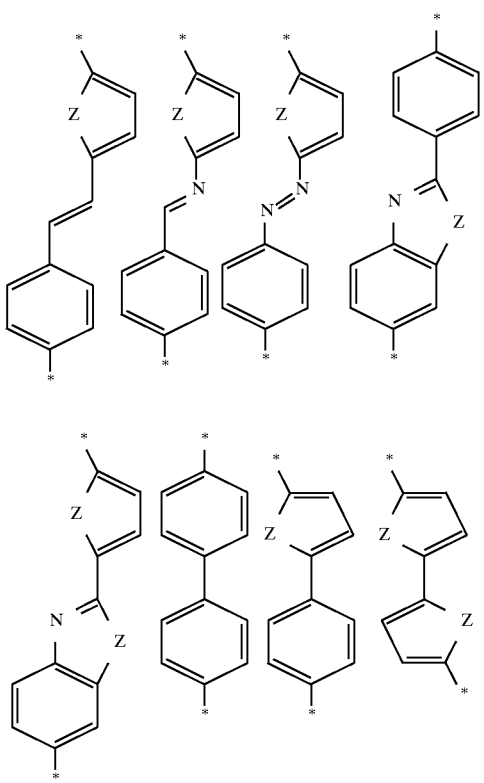

wherein:

* designates a point of attachment between the bridging group and a rigid connecting group;

R is selected from the group consisting of hydrogen, methyl, ethyl, propyl, allyl, hydroxyethyl and benzyl;

$R_1$ is hydrogen or methyl;

X is selected from the group consisting of sulphonate $(SO_3)^-$, carboxylate $(CO_2)^-$ and phosphonate $(PO_4)^{2-}$; and n and m are independently 2 or 3.

17. A polarized film, as described in claim 10, wherein at least one of the rigid connecting groups of the chromophore $C_F{'}$ and $C_S{'}$, are independently selected from the group consisting of:

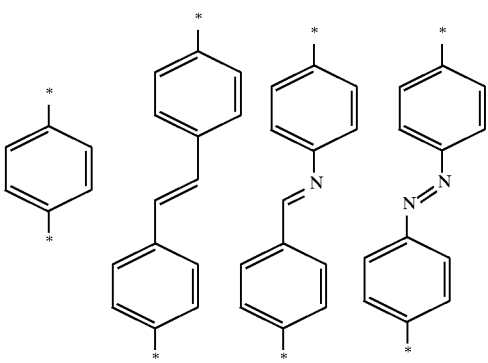

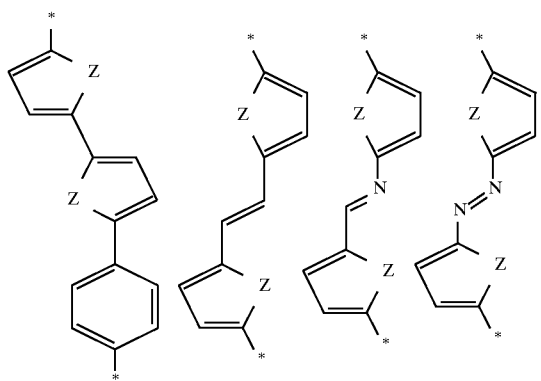

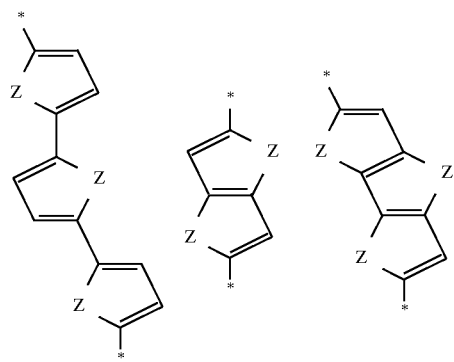

-continued

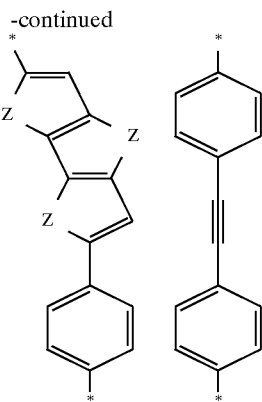

wherein:

* designates a point of attachment between the bridging group and a rigid connecting group; and Z is independently selected from the group consisting of thio ether (S), ether (O), and an amine (NH).

18. A method for making the polar films of claim 10, comprising the steps of:

utilizing a Langmuir-Blodgett trough in which the subphase of said trough is an aqueous solution of said S' polymer;

spreading a non-aqueous solution of said F' polymer on said subphase;

waiting about 1 to 60 minutes for said molecular bilayer to form;

compressing said molecular bilayer with one or more moveable walls of said LB Langmuir-Blodgett trough while maintaining the surface pressure at the gas-liquid interface between 20% and 90% of the minimum pressure required to collapse said molecular bilayer film; and dipping, repeatedly, a substrate oriented between 0° and 90° with respect to the surface of the gas-liquid interface, through the aqueous-gas interface by the Z- or X-type deposition procedure until said multilayer film comprised of from 1 to about 4000 bilayers is achieved.

* * * * *

UNITED STATES PATENT AND TRADEMARK OFFICE
CERTIFICATE OF CORRECTION

PATENT NO. : 5,882,785
DATED : Mar. 16, 1999
INVENTOR(S) : Roberts; Lindsay; Stenger-Smith; Zarras; Hollins; Wynne; Chafin It is certified that error appears in the above-identified patent and that said Letters Patent is hereby corrected as shown below:

On the title page, "[75] Inventors:", list Marion J. Roberts as the first named inventor.

5. Claim 2, lines 1 to 8, that portion of the left-hand formula reading

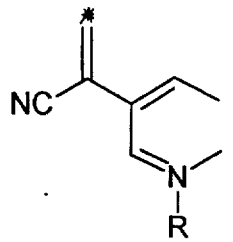  should read  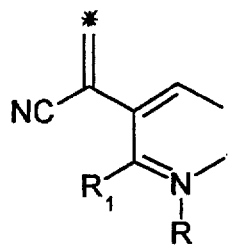

Signed and Sealed this

Twenty-sixth Day of December, 2000

Attest:

Q. TODD DICKINSON

Attesting Officer    Director of Patents and Trademarks